United States Patent [19]

Sireci

[11] Patent Number: 4,899,018

[45] Date of Patent: Feb. 6, 1990

[54] UTILITY ROUTING SYSTEM FOR MODULAR PANELS

[76] Inventor: Donald J. Sireci, 9 Oxford Dr., Deerfield, Ill. 60015

[21] Appl. No.: 278,849

[22] Filed: Dec. 2, 1988

Related U.S. Application Data

[63] Continuation-in-part of Ser. No. 11,289, Feb. 5, 1987, Pat. No. 4,808,768.

[51] Int. Cl.⁴ .............................................. H02G 3/28
[52] U.S. Cl. ..................................................... 174/48
[58] Field of Search .................... 174/48; 52/220, 221

[56] References Cited

U.S. PATENT DOCUMENTS

| 4,135,775 | 1/1979 | Driscoll | 52/221 X |
| 4,270,020 | 5/1981 | Kenworthy | 174/48 |

Primary Examiner—Arthur T. Grimley
Assistant Examiner—David A. Tone

[57] ABSTRACT

An improved utility routing system for standardized modular panels that includes receptacle baseline boxes designed to slide and clamp to track-like ribs on the bottoms of the modular panels.

11 Claims, 2 Drawing Sheets

UTILITY ROUTING SYSTEM FOR MODULAR PANELS

RELATED APPLICATION

This application is a continuation-in-part of my co-pending U.S. application entitled "UTILITY ROUTING SYSTEM FOR MODULAR PANELS", Ser. No. 011,289 filed on Feb. 5, 1987 now U.S. Pat. No. 4,808,768.

BACKGROUND OF THE INVENTION

Modular office systems have become increasingly popular over the last decade for customizing open office space into compartmental individualized semi-private office areas. These systems are particularly useful in modern unpartitioned office buildings where the construction of permanent office or privacy partitions would be quite expensive, particularly where the tenant does not have a sufficiently long term lease to justify the expenditure for the construction of permanent office subdivisions.

These modular office systems basically consist of a plurality of standard vertical panels that are easily connectable to one another in either a straight line, a simple 90 degree corner, a "T" configuration, or a four-way 90 degree crossing configuration. Present day office systems of this type include panels in a plurality of standard widths, for example, 24 inch width, 30 inch width, and 48 inch width. Each of these panels has a rectangular peripheral frame assembly, and a baseline frame over which decorative cover panels are pivotally mounted. This baseline frame is adapted to carry one or more electrical receptacles on the lower horizontal tubular frame member, and these receptacles are referred to as baseline receptacles. In 48 inch panels there are frequently provided two receptacle openings, and in the 24 inch and 30 inch panels, one receptacle opeing is usually provided. In addition to the baseline receptacle openings or adaptations, these modular panels are provided with an adaptation for a higher receptacle, commonly referred to as a beltline receptacle.

During the installation of these modular office systems, the installing contractor will subcontract to an electrical contractor the job of installing the beltline and baseline receptacles in the frames after the frames have been set up and prior to the addition of the covering panels to the frames. Presently, conventional receptacle boxes are mounted on the frame by the contractor and the boxes are interconnected by either BX cable or conduit. This requires the electrical contractor to measure the distance between receptacles and to cut the BX or conduit to the needed dimensions. One particular problem is that the standard receptacle boxes and conventional wiring techniques are not acceptable in these modular office systems in locales with very strict fire codes.

It is a primary object of the present invention to ameliorate the problems noted above in electrical wiring systems for receptacles in modular office systems.

SUMMARY OF THE PRESENT INVENTION

In accordance with the present invention an electrical raceway or routing system is provided for standardized modular office systems that include strengthening ribs in their bottom plate which are utilized to guide and lock the present baseline boxes to the panels.

In the type of modular panels to which the present routing system is adapted, a lower clearance area is provided in each panel to accommodate routing systems, and this area is bounded on the bottom by a base plate, its sides by removable covers, and its top by its top plate. The panel is supported on the base plate by a plurality of tubular guide posts. The bottom plate has a pair of spaced ribs in the form of inverted U-shaped projections that run linearly along the base plate solely for strength purposes.

In accordance with the present invention, these strengthening ribs in the base plate are utilized as tracks to guide and lock the baseline boxes in position. Toward this end, the baseline box is provided with a bottom slide that takes the form of a channel member fixed to the bottom of the box with the legs of the channel being spaced so they just fit between the base plate strengthening ribs. This facilitates installation of the box because the ribs permit the installer to slide the baseline box back and forth until it is in alignment with the opening in the removable cover. It also transversely locates the box in the routing area and assures axial alignment of the box with respect to the panel itself.

The baseline box is clamped to the base plate by another channel shaped clamping member that the installer positions underneath the base plate with the legs of the channel projecting up into the same ribs. Thus, the ribs are also utilized to assist the installer in rapidly locating this clamping member with respect to the base plate because frequently the installer is unable to see the clamping member since it is underneath the base plate during installation, but he can feel when it is located in the rib grooves.

A threaded fastener is passed through the inside of the baseline box, through a hole in the base plate and then into a threaded aperture in the clamping member to permanently lock the baseline box to the base plate.

Routing is completed by connecting conduit between adjacent baseline boxes and thereafter a cover is placed over the baseline box and after wiring, a receptacle is mounted in the box.

Further objects of the present invention will appear more clearly from the following detailed description.

DETAILED DESCRIPTION OF THE PREFERRED EMBODIMENT

Figure 1:
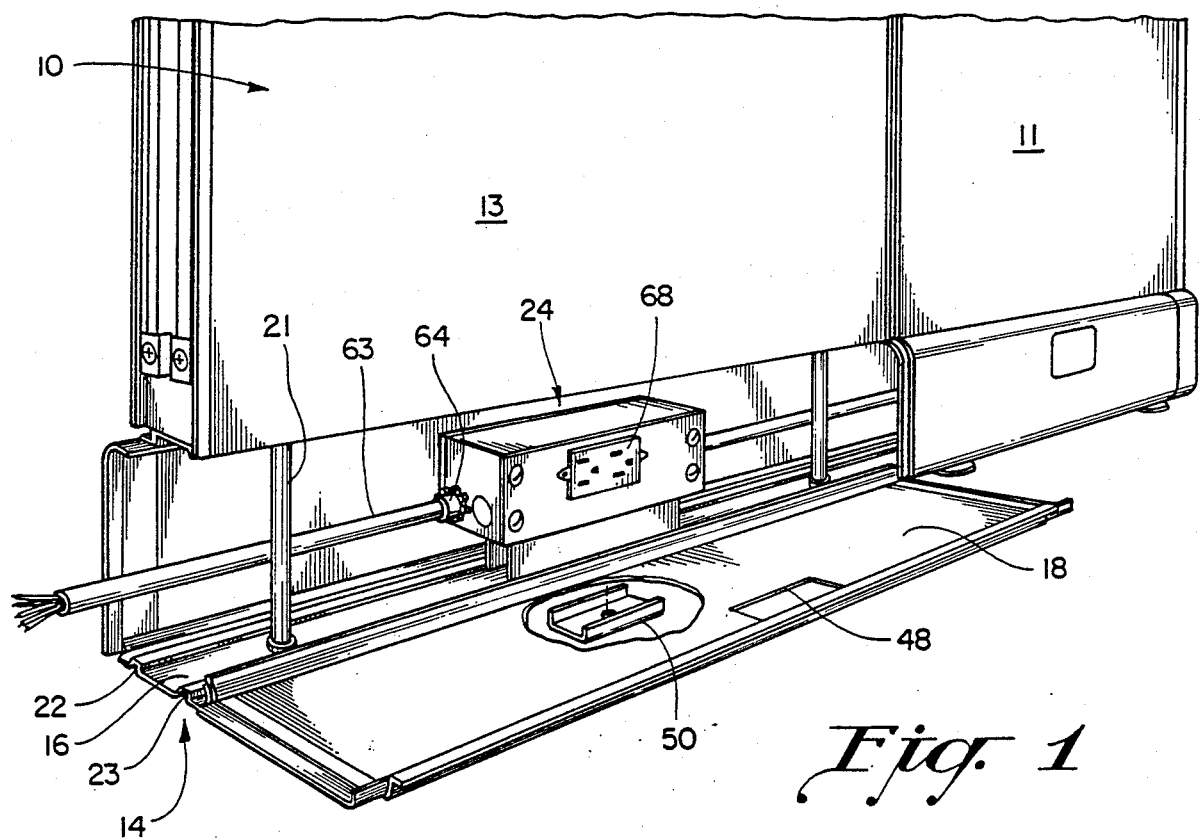
FIG. 1 is a perspective view of two adjacent standard modular panels with a portion of the present routing system illustrated in partly exploded fashion, and with one of the panel side covers open.
Figure 3:
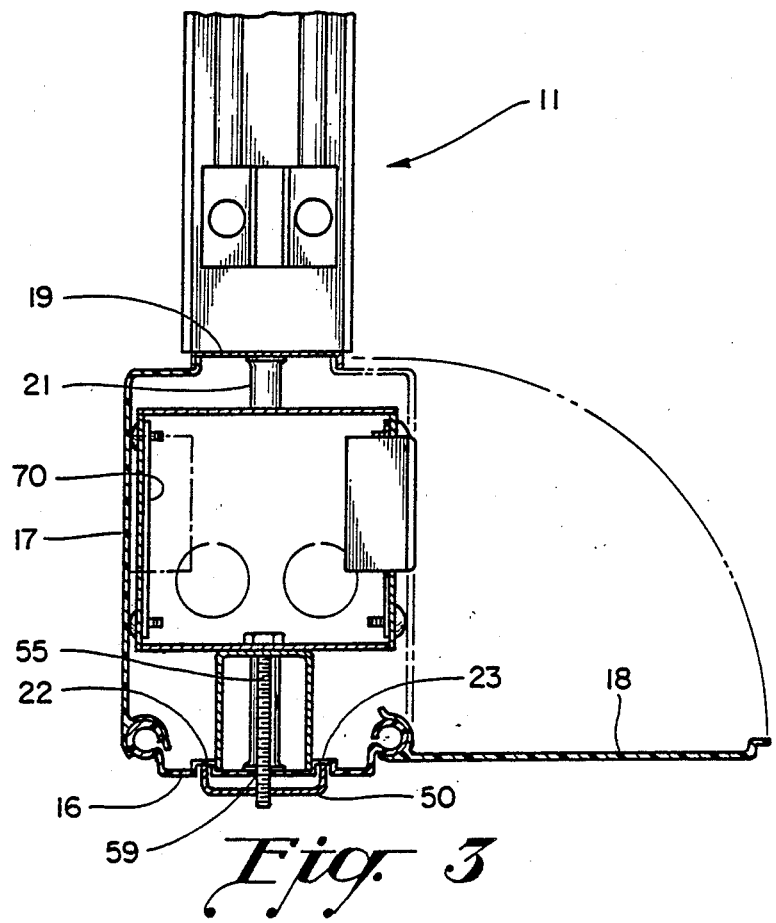
FIG. 3 is a cross-section through an exemplary panel routing area also showing the present baseline box in cross-section.
Figure 4:
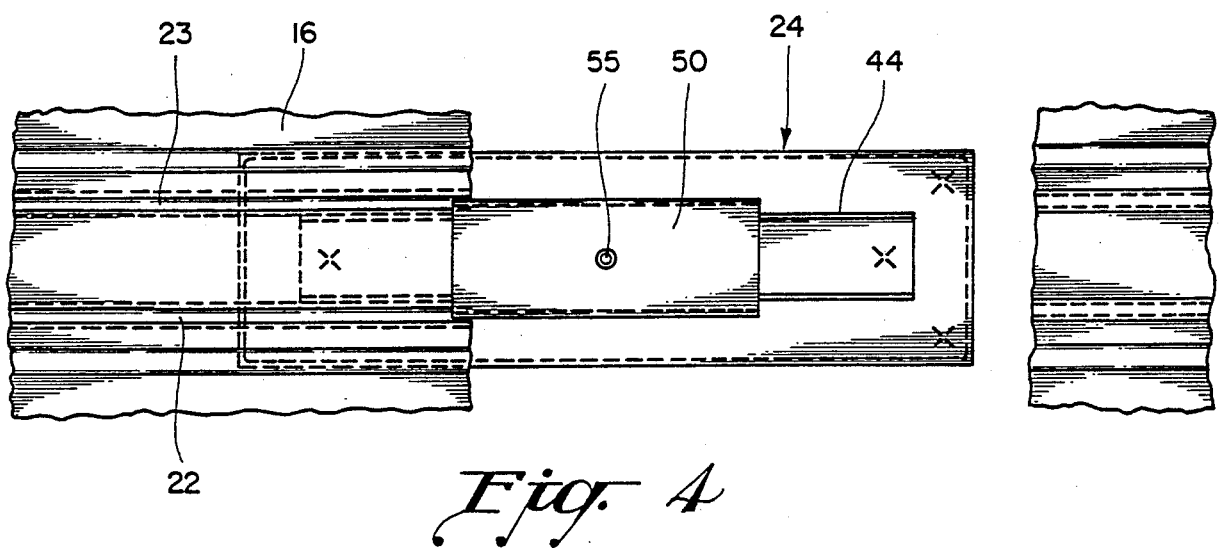
FIG. 4 is a bottom view showing the baseline box clamping channel in position.

Referring to the drawings and particularly FIGS. 1, 3 and 4, a pair of interconnected standard modularized panels 10 and 11 are illustrated consisting generally of a panel assembly 13 supported on a lower base 14 that defines a routing area for utilities such as telephone and electricity. Base assembly 14 is seen to generally include a bottom plate 16, pivotally mounted side covers 17 and 18, a top plate 19 fixed to the lower part of panel 13, and posts 21 interconnecting the top plate 19 and bottom plate 16.

The bottom plate 16 is formed with a pair of inverted "U" shaped stiffening ribs 22 and 23 that are utilized according to the present invention to guide and locate baseline boxes 24 according to the present invention.

Figure 2:
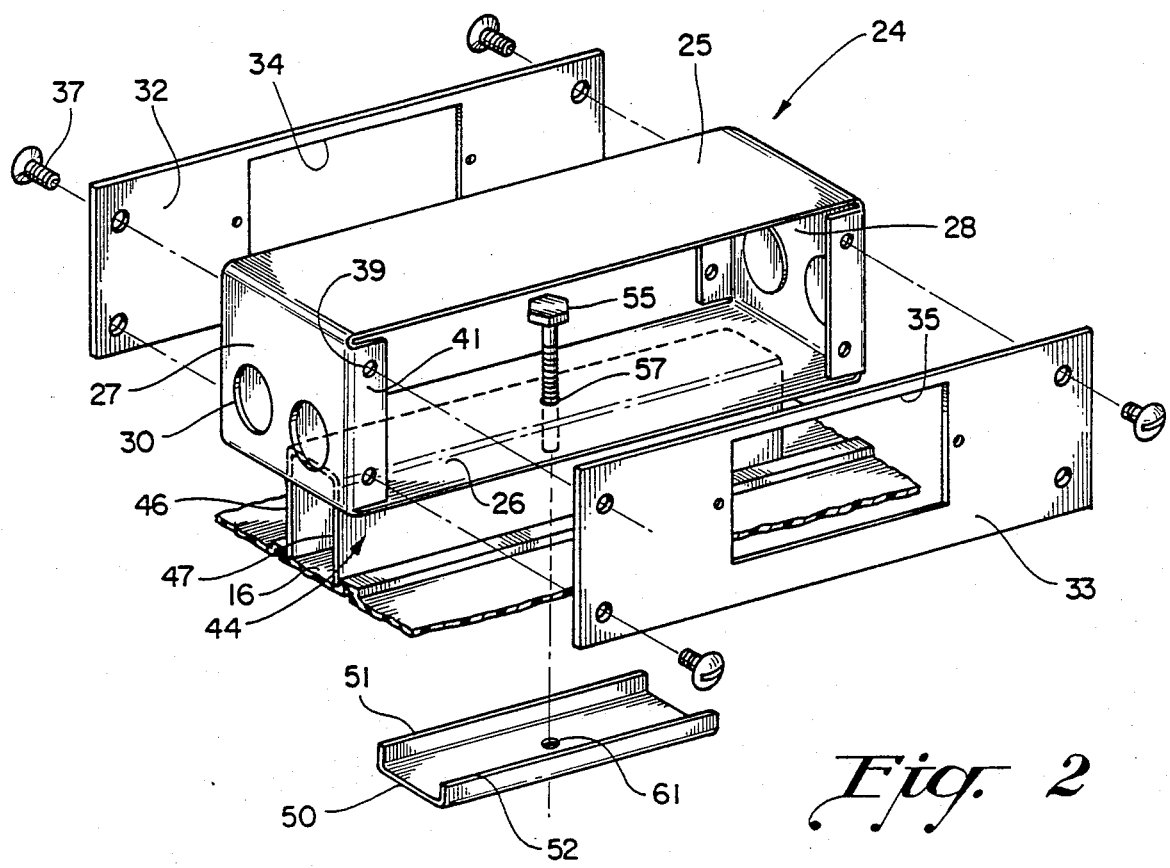
FIG. 2 is an exploded perspective view of the present baseline box assembly.

As seen most clearly in FIG. 2, baseline box assembly 24 includes a top wall 25, a bottom wall 26, and end walls 27 and 28, each having offset spaced knock-out openings 30 therein. The open sides of the baseline box are closed by flat side covers 32 and 33 having rectangular receptacle receiving openings 34 and 35 therein. The side covers 32 and 33 are fixed to the baseline box by fasteners 37 that have threaded openings 39 and end wall flanges 41.

A slide channel 44 is welded to the bottom wall 26 of the baseline box and has parallel downwardly depending projections 46 and 47 that are spaced to just fit between the ribs 22 and 23 in the bottom plate 16, as seen clearly in FIG. 3. In this way, ribs 22 and 23 guide the baseline box 24 for sliding motion in the bottom plate 16 as the installer centers the baseline box with respect to receptacle opening 48 in base cover 18, as seen in FIG. 1.

The ribs 22 and 23 also provide perfect transverse alignment of the baseline box 24, as well as maintain the baseline box parallel to the panels themselves.

The baseline box 24 is held fixed to the bottom plate 16 by a channel shaped clamping member 50 having upstanding legs 51 and 52 that are spaced so that they fit within the ribs 22 and 23, as clearly seen in FIG. 3. The ribs not only provide the clamping surface for member 50 but also help the installer in positioning the clamping member since he frequently cannot see underneath the bottom plate 16 during the routing installation, but he can easily feel where the legs enter the grooves of the ribs.

The clamping member 50 is fastened to the underside of the bottom plate 16 by a threaded fastener 55 that is placed through an opening 57 in the baseline box, a hole in the top of slide 44, through a hole 59 in the bottom plate 16 and into a threaded aperture 61 in the clamping member 50.

During installation, the installer places the baseline box 24 between the ribs 22 and 23 and slides it back and forth until it is aligned with the opening 48 in cover 18 with one or both of the side covers 32 and 33 removed. He then places bolt 55 through the box and the hole 59 and threads it into clamping plate aperture 61 until the box 24 is securely fastened to the bottom plate. Thereafter, conduits 63 and connectors 64 with wiring are installed, and finally, the side cover 33 is screwed to the box 24 and receptacle 68 is installed completing the assembly with the receptacle 68 perfectly aligned with the opening 48 in all orthogonal directions.

In the event one of the side plates 32 or 33 is not needed to hold a receptacle 68, it is closed by a suitable cover plate from the inside, such as plate 70 illustrated in FIG. 3.

The offset positioning of the connector receiving apertures 30 in the box end walls 27 enables conduit 63 to pass by the support posts 21.

I claim:

1. A utility routing system for interconnected modular wall panels having a base assembly consisting of a bottom plate and a top plate interconnected by struts where the bottom plate has a pair of spaced parallel linearly extending ribs, comprising: a baseline box adapted to receive at least one receptacle, projection means on the baseline boxes sized to slidably engage the bottom plate ribs so they define a track for the box, and means for clamping the baseline box to the bottom plate in any desired position.

2. A utility routing system for interconnected modular wall panels as defined in claim 1, wherein the means to clamp the baseline box to the bottom plate includes a clamping plate engageable with the underside of the bottom plate, and a fastener extending through the baseline box, the bottom plate and into the clamping plate.

3. A utility routing system for interconnected modular wall panels as defined in claim 1, wherein the baseline box has a connector opening at each end thereof offset from the centerline of the baseline box so conduits connected to two openings avoid the struts interconnecting the top plate and the bottom plate.

4. A utility routing system for interconnected modular wall panels as defined in claim 1, wherein the ribs on the bottom plate are inverted "U" shaped in configuration, said baseline box projection means including spaced parallel axially extending projections sized to just fit between the "U" shaped bottom plate ribs so the baseline box is guided by the bottom plate projections and transversely locked thereby.

5. A utility routing system for interconnected modular wall panels as defined in claim 1, wherein the baseline box projection means includes an inverted channel member having spaced legs.

6. A utility routing system for interconnected modular wall panels as defined in claim 4, wherein the means to clamp the baseline box to the bottom plate includes a channel shaped member having upwardly extending legs that fit within the inverted "U" shaped projections in the bottom plate.

7. A utility routing system for standardized modular panels having a bottom plate with a pair of integral inverted "U" shaped parallel projections defining a track for the routing system, comprising: a generally rectangular baseline box adapted to receive and hold a receptacle, a slide member connected to the bottom of the baseline box sized to slidably engage the bottom plate and slide between the "U" shaped track projections, and a channel shaped clamp having legs that fit into the "U" shaped projections on the underside of the bottom plate, and fastener means engaging the clamp and the baseline box for drawing the slide and baseline box toward the bottom plate.

8. A utility routing system for standardized modular panels as defined in claim 7, wherein the baseline box has a connector opening at each end thereof offset from the centerline of the baseline box so conduits connected to two openings avoid struts interconnecting the top plate and the bottom plate.

9. A utility routing system for standardized modular panels as defined in claim 7, wherein the baseline box has a removable front plate, said front plate having an opening through which a portion of the receptacle extends.

10. A utility routing system for standardized modular panels as defined in claim 7, wherein said slide member includes a channel shaped member having legs spaced to fit between and engage the inverted "U" shaped projections on the bottom plate.

11. A utility routing system for standardized modular panels having a bottom plate with a pair of integral inverted "U" shaped parallel projections defining a track for the routing system, comprising: a generally rectangular baseline box adapted to receive and hold a receptacle, a slide member connected to the bottom of the baseline box sized to slidably engage the bottom plate and slide between the "U" shaped track projections, and a channel shaped clamp having legs that fit into the "U" shaped projections on the underside of the bottom plate, and means engaging the clamp and the baseline box for drawing the slide and baseline box toward the bottom plate, wherein the baseline box has a connector opening at each end thereof offset from the centerline of the baseline box so conduits connected to the openings avoid struts interconnecting the top plate and the bottom plate, the baseline box having a removable front plate, said front plate having an opening through which a portion of the receptacle extends, said slide including a channel shaped member having legs spaced to fit between and engage the inverted "U" shaped projections on the bottom plate.

* * * * *